(12) United States Patent
Fortl et al.

(10) Patent No.: US 9,676,463 B1
(45) Date of Patent: Jun. 13, 2017

(54) PLANETARY TRANSMISSION ARRANGEMENTS FOR MARINE PROPULSION DEVICES

(71) Applicant: Brunswick Corporation, Lake Forest, IL (US)

(72) Inventors: Karel Fortl, Ceske Budejovice (CZ); Jiri Jager, Prague (CZ)

(73) Assignee: Brunswick Corporation, Lake Forest, IL (US)

( * ) Notice: Subject to any disclaimer, the term of this patent is extended or adjusted under 35 U.S.C. 154(b) by 261 days.

(21) Appl. No.: 14/585,872

(22) Filed: Dec. 30, 2014

(51) Int. Cl.
| | |
|---|---|
| *B63H 23/08* | (2006.01) |
| *F16H 3/44* | (2006.01) |
| *B63H 21/00* | (2006.01) |
| *B63H 5/10* | (2006.01) |
| *B63H 20/20* | (2006.01) |
| *B63H 23/02* | (2006.01) |

(52) U.S. Cl.
CPC ............... *B63H 23/08* (2013.01); *B63H 5/10* (2013.01); *B63H 20/20* (2013.01); *B63H 21/00* (2013.01); *F16H 3/44* (2013.01); *B63H 2023/0283* (2013.01)

(58) Field of Classification Search
CPC ...... F16H 3/46; F16H 3/56; F16H 2200/2007; F16H 2200/2035; F16H 2200/0082; B63H 23/08; B63H 20/20; B63H 2023/0283
See application file for complete search history.

(56) References Cited

U.S. PATENT DOCUMENTS

| | | | |
|---|---|---|---|
| 3,601,226 A * | 8/1971 | Masaoka | F01M 1/02 123/196 R |
| 6,350,165 B1 | 2/2002 | Neisen | |
| 6,435,923 B1 | 8/2002 | Ferguson | |
| 7,267,068 B2 | 9/2007 | Bradley et al. | |
| 7,305,928 B2 | 12/2007 | Bradley et al. | |
| 7,561,886 B1 | 7/2009 | Gonring et al. | |
| 7,891,263 B2 | 2/2011 | Mowbray et al. | |
| 7,942,712 B2 | 5/2011 | Suzuki et al. | |
| 8,100,732 B2 | 1/2012 | Nakamura et al. | |

(Continued)

OTHER PUBLICATIONS

"Transmission Brake Bands" retrieved from www.freeacestudyguides.com dated Dec. 6, 2010.*

(Continued)

*Primary Examiner* — Stacey Fluhart
(74) *Attorney, Agent, or Firm* — Andrus Intellectual Property Law, LLP

(57) ABSTRACT

A transmission is for a marine propulsion device having an internal combustion engine that drives a propulsor for propelling a marine vessel in water. An input shaft is driven into rotation by the engine. An output shaft drives the propulsor into rotation. A forward planetary gearset that connects the input shaft to the output shaft so as to drive the output shaft into forward rotation. A reverse planetary gearset that connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

16 Claims, 9 Drawing Sheets

(56) References Cited

U.S. PATENT DOCUMENTS

| | | | |
|---|---|---|---|
| 8,105,199 B2 | 1/2012 | Okabe | |
| 8,109,800 B2 | 2/2012 | Okabe et al. | |
| 8,118,701 B2 | 2/2012 | Okabe et al. | |
| 8,157,694 B2 | 4/2012 | Nakamura et al. | |
| 8,246,402 B2 | 8/2012 | Okabe et al. | |
| 8,277,270 B2 | 10/2012 | Ryuman | |
| 8,317,556 B2 | 11/2012 | Suzuki et al. | |
| 8,478,464 B2 | 7/2013 | Arbuckle et al. | |
| 8,777,681 B1 | 7/2014 | McNalley et al. | |
| 8,924,054 B1 | 12/2014 | Arbuckle et al. | |
| 2001/0012810 A1* | 8/2001 | Ohkubo | F16H 3/66 475/280 |
| 2008/0227585 A1* | 9/2008 | Okabe | B63H 20/14 475/269 |
| 2009/0088289 A1* | 4/2009 | Baldwin | F16H 3/66 475/276 |
| 2009/0203489 A1* | 8/2009 | Okabe | B63H 23/08 475/271 |
| 2011/0241306 A1* | 10/2011 | Serkh | B62M 11/145 280/261 |
| 2012/0214636 A1* | 8/2012 | Hart | F16H 3/666 475/276 |
| 2014/0045637 A1* | 2/2014 | Dionne | F16H 37/022 475/214 |

OTHER PUBLICATIONS

Unpublished U.S. Appl. No. 14/585,872, filed Dec. 30, 2014.
Unpublished U.S. Appl. No. 14/258,516, filed Apr. 22, 2014.
Unpublished U.S. Appl. No. 14/574,953, filed Dec. 18, 2014.

* cited by examiner

PLANETARY TRANSMISSION ARRANGEMENTS FOR MARINE PROPULSION DEVICES

FIELD

The present disclosure relates to marine propulsion devices, and more particularly to transmission arrangements for marine propulsion devices.

BACKGROUND

The following U.S. Patents are incorporated herein by reference:

U.S. Pat. No. 6,350,165 discloses an inboard/outboard powered watercraft that incorporates a transmission in its vertical drive unit for providing two forward speeds plus reverse. The transmission is packaged to fit within the vertical drive unit by incorporating a bevel gear apparatus. In one embodiment, the transmission also includes a planetary gear apparatus together with two hydraulic clutches and a ring gear brake. In a second embodiment, three hydraulic clutches are utilized with bevel gears alone to provide the two forward and reverse speeds.

U.S. Pat. No. 6,435,923 discloses a two-speed transmission with reverse gearing for a watercraft. The transmission is disposed in the gimbal housing passing through the transom of the watercraft. A pair of planetary gears share a common ring gear to provide both forward-reverse and first-second gearing in a very compact package. The transmission housing may be formed in two portions, a first housing containing the forward-reverse gear mechanisms and a second housing containing the first-second gear mechanism. The transmission output shaft is connected to the drive shaft of a vertical drive unit by a double universal joint that may be replaced without disassembling the transmission components.

U.S. Pat. No. 7,891,263 discloses a two speed transmission system mounted for driving a marine craft comprising: an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train, wherein in shifting between the first gear ratio and the second gear ratio one of the friction clutches is disengaged using controlled slippage while the other friction clutch is engaged using controlled slippage.

U.S. Pat. No. 7,942,712 discloses an outboard motor that includes a power source, a boat propulsion section, a shift position switching mechanism, a clutch actuator, and a control device. The shift position switching mechanism switches among a first shift position in which a first clutch is engaged and a second clutch is disengaged, a second shift position in which the first clutch is disengaged and the second clutch is engaged, and a neutral position in which both the first clutch and the second clutch are disengaged. When a gear shift is to be made from the first shift position to the second shift position, the control section causes the clutch actuator to gradually increase an engagement force of the second clutch. The outboard motor reduces the load to be applied to the power source and the power transmission mechanism at the time of a gear shift in a boat propulsion system including an electronically controlled shift mechanism.

U.S. Pat. No. 8,109,800 discloses a transmission device that includes hydraulic type transmission mechanisms arranged to change the speed or the direction of rotation of an engine, and hydraulic pressure control valves arranged to control hydraulic pressure supplied to the hydraulic type transmission mechanisms. The hydraulic pressure control valves are disposed on one side or the other side in the watercraft width direction. The transmission device provides an outboard motor capable of securing cooling characteristics of a hydraulic pressure control valve without incurring complexity in structure and increase in cost.

U.S. Pat. No. 8,157,694 discloses an outboard motor having a power transmission mechanism for transmitting power of an engine to a propeller. The power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

U.S. Pat. No. 8,277,270 discloses a boat propulsion unit that includes a power source, a propeller, a shift position switching mechanism, a control device, and a retention switch. The propeller is driven by the power source to generate propulsive force. The shift position switching mechanism has an input shaft connected to a side of the power source, an output shaft connected to a side of the propeller, and clutches that change a connection state between the input shaft and the output shaft. A shift position of the shift position switching mechanism is switched among forward, neutral, and reverse by engaging and disengaging the clutches. The control device adjusts an engagement force of the clutches. The retention switch is connected to the control device. When the retention switch is turned on by an operator, the control device controls the engagement force of the clutches to retain a hull in a predefined position. The boat propulsion unit provides a boat propulsion unit that can accurately retain a boat at a fixed point.

U.S. Pat. No. 8,317,556 discloses a boat propulsion system that includes a power source, a propulsion section, a shift position switching mechanism arranged to switch among a first shift position, a second shift position, and a neutral position, a gear ratio switching mechanism, an actuator, and a control section. When switching is to be performed from the neutral position to the first shift position and the high-speed gear ratio, the control section is arranged to cause the actuator to, maintain the low-speed gear ratio, switch to the first shift position, and then establish the high-speed gear ratio when the current gear ratio of the gear ratio switching mechanism is the low-speed gear ratio, and cause the actuator to establish the low-speed gear ratio before switching to the first shift position, switch to the first shift position, and then establish the high-speed gear ratio when the current gear ratio of the gear ratio switching mechanism is the high-speed gear ratio. This arrangement improves the durability of a power source and a power transmission mechanism in a boat propulsion system including an electronically controlled shift mechanism.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, a transmission is for a marine propulsion device having an internal combustion engine that drives a propulsor for propelling a marine vessel in water. An input shaft is driven into rotation by the engine. An output shaft drives the propulsor into rotation. A forward planetary gearset connects the input shaft to the output shaft so as to drive the output shaft into forward rotation. A reverse planetary gearset connects the input shaft to the output shaft so as to drive the output shaft into reverse rotation. A forward brake engages the forward planetary gearset in a forward gear wherein the forward planetary gearset drives the output shaft into the forward rotation. A reverse brake engages the reverse planetary gearset in a reverse gear wherein the reverse planetary gearset drives the output shaft into the reverse rotation.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
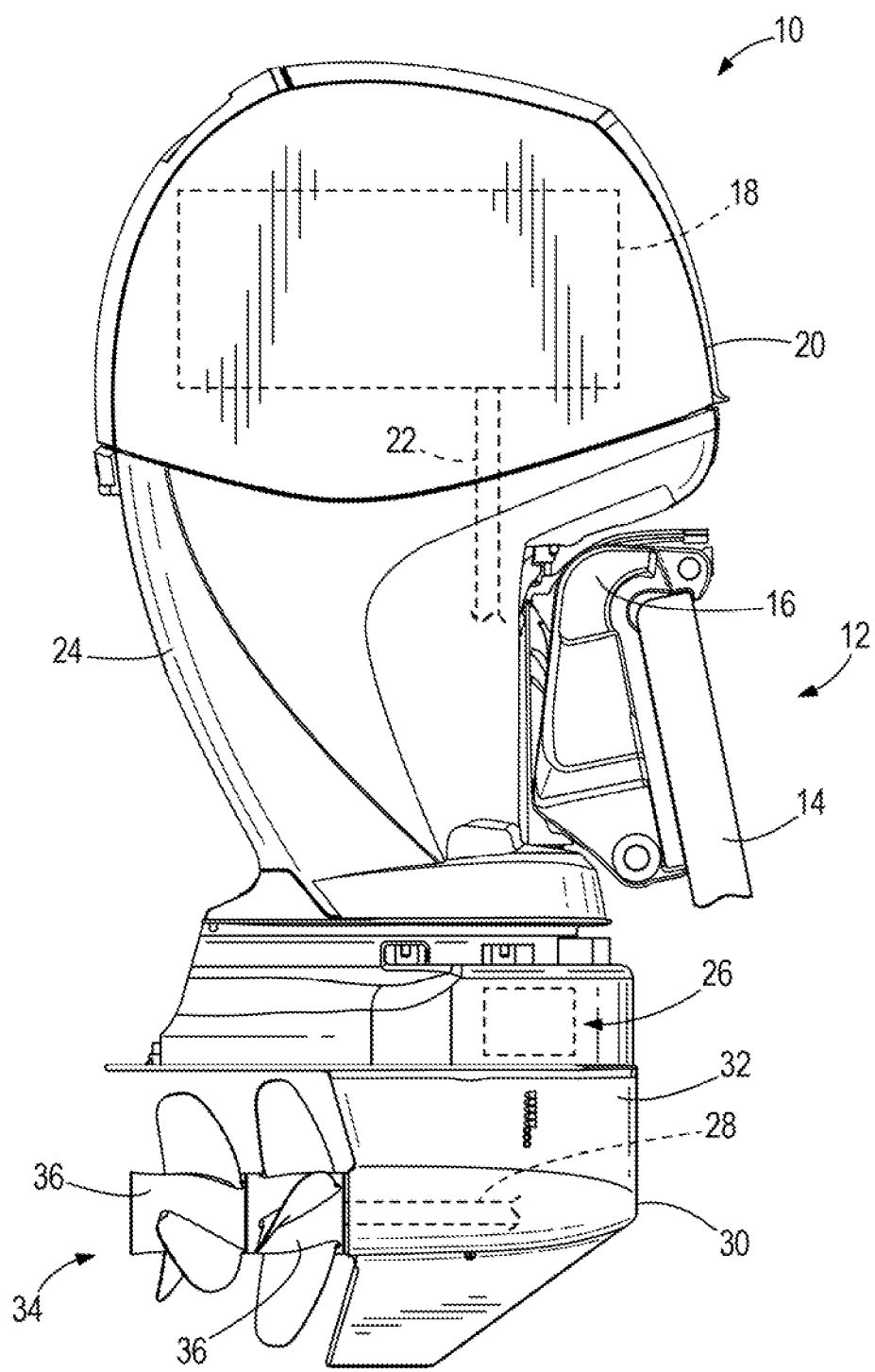
FIG. 1 is a side view of an outboard marine propulsion device.

FIG. 1 depicts an outboard marine propulsion device 10 for propelling a marine vessel 12 in water. The outboard marine propulsion device 10 is connected to the transom 14 of the marine vessel 12 by a transom bracket 16. As is conventional, the outboard marine propulsion device 10 includes an internal combustion engine 18 located within an upper cowling 20. The engine 18 causes rotation of a drive shaft 22 that extends downwardly from the engine 18 through a drive shaft housing 24. A transmission 26 relays rotational force from the drive shaft 22 to a propulsor shaft 28 located in a propulsor shaft housing 30. The transmission 26 is located in or above a gearcase housing 32, which is disposed beneath the drive shaft housing 24. Rotation of the propulsor shaft 28 causes rotation of a propulsor 34, which in this example includes counter rotating propellers 36. The type of propulsor 34 can vary from that which is shown, and in other examples can include single or multiple propellers or single or multiple impellers, and/or the like.

Embodiments of the transmission 26 are shown in FIGS. 2-12. Referring to FIGS. 2-6, the transmission 26 includes an input shaft 38 that is driven into rotation by the engine 18. The input shaft 38 can be the drive shaft 22 or an extension of the drive shaft 22 such that rotation of the drive shaft 22 causes concurrent rotation of the input shaft 38. The transmission 26 also includes an output shaft 40 that is connected to the propulsor shaft 28 via for example a conventional gearset (not shown) such that rotation of the output shaft 40 causes concurrent rotation of the propulsor shaft 28. The input shaft 38 and output shaft 40 are connected together by forward and reverse planetary gearsets 42, 44 such that the input shaft 38 and output shaft 40 are coaxially aligned.

As will be described in more detail herein below, the forward planetary gearset 42 connects the input shaft 38 to the output shaft 40 so as to drive the output shaft 40 into forward rotation. The reverse planetary gearset 44 connects the input shaft 38 to the output shaft 40 so as to drive the output shaft 40 into reverse rotation. The forward and reverse planetary gearsets 42, 44 both provide the same speed reduction from the input shaft 38 to the output shaft 40. In one non-limiting example, the nominal reduction is 1.68:1. A forward brake 46 engages the forward planetary gearset 42 in forward gear so as to drive the output shaft 40 into the forward rotation. A reverse brake 48 engages the reverse planetary gearset 44 in reverse gear so as to drive the output shaft 40 into the reverse rotation. Actuation of neither of the forward brake 46 and reverse brake 48 actuates a neutral gear wherein the output shaft 40 is disconnected from the input shaft 38.

Referring to FIGS. 3-6, the forward planetary gearset 42 includes a forward ring gear 50 that is fixed to and rotates with the input shaft 38. The forward ring gear 50 and the input shaft 38 can be formed together as one piece or can be separate pieces that are connected together. The forward ring gear 50 includes a radially inwardly facing gear surface 52. The forward planetary gearset 42 also includes a forward sun gear 54 that is disposed on the output shaft 40. The forward sun gear 54 has a radially outwardly facing gear surface 56 and a radially inwardly facing bearing surface 58. The radially inwardly facing bearing surface 58 bears on the output shaft 40 such that the forward sun gear 54 is rotatable with respect to the output shaft 40, and vice verse. The type of bearing surface can vary and in this example includes roller bearings 59. The forward planetary gearset 42 further includes a forward brake drum 60 that rotates with the forward sun gear 54. The forward brake drum 60 can be formed as one component with the forward sun gear 54 or the forward brake drum 60 can be a separate component that is attached to the forward sun gear 54.

The forward planetary gearset 42 further includes a plurality of forward planet gears 62 that are rotatable about their own center axis 64 and that are radially disposed between the forward ring gear 50 and the forward sun gear 54. Each forward planet gear 62 has a radially outwardly facing gear surface 66 that is engaged with the radially inwardly facing gear surface 52 of the forward ring gear 50 and the radially outwardly facing gear surface 56 of the forward sun gear 54. The forward planetary gearset 42 further includes a forward carrier 68 that retains the plurality of forward planet gears 62 so that the forward planet gears 62 are rotatable about their own center axis 64. The forward carrier 68 is fixed to and rotates with the output shaft 40 and is rotatable with respect to the forward ring gear 50 and the forward sun gear 54. The manner of connection between the forward carrier 68 and the output shaft 40 can vary. In this example, a first plurality of splines 70 are formed on a radially inwardly facing surface 71 of the forward carrier 68 and engage with a second plurality of splines 72 on a radially outer surface 73 of the output shaft 40.

The reverse planetary gearset 44 includes a reverse sun gear 74 that is fixed to and rotates with the input shaft 38. The reverse sun gear 74 can be formed as one component with the input shaft 38 or formed separately from and connected to the input shaft 38. The reverse sun gear 74 has a radially outwardly facing gear surface 76. The reverse planetary gearset 44 also has a reverse ring gear 78 that is fixed to and rotates with the forward carrier 68. The reverse ring gear 78 and the forward carrier 68 can be formed as one component or separate components that are connected together. In this example, the reverse ring gear 78 has peripheral tabs 80 that are received in peripheral recesses 82 that are circumferentially spaced apart on the outer radius of the forward carrier 68. The reverse ring gear 78 includes a radially inwardly facing gear surface 84.

The reverse planetary gearset 44 further includes a plurality of reverse planet gears 86 that are rotatable about their own center axis 88 and that are radially disposed between the reverse ring gear 78 and the reverse sun gear 74. Each reverse planet gear 86 has a radially outwardly facing gear surface 90 that is engaged with the radially inwardly facing gear surface 84 of the reverse ring gear 78 and the radially outwardly facing gear surface 76 of the reverse sun gear 74. The reverse planetary gearset 44 also has a reverse carrier 92 that retains the reverse planet gears 86 so that the reverse planet gears 86 can rotate about their own center axis 88. The reverse carrier 92 is rotatable with respect to the reverse ring gear 78 and the reverse sun gear 74. A reverse brake drum 94 is fixed to and rotates with the reverse carrier 92. The reverse brake drum 94 and reverse carrier 92 can be formed as a single component or can be separate components that are connected together. Pluralities of bearings 97, 99 (see FIGS. 10-12), such as roller bearings, support the reverse planetary gearset 44 with respect to the output shaft 40.

Figure 7:
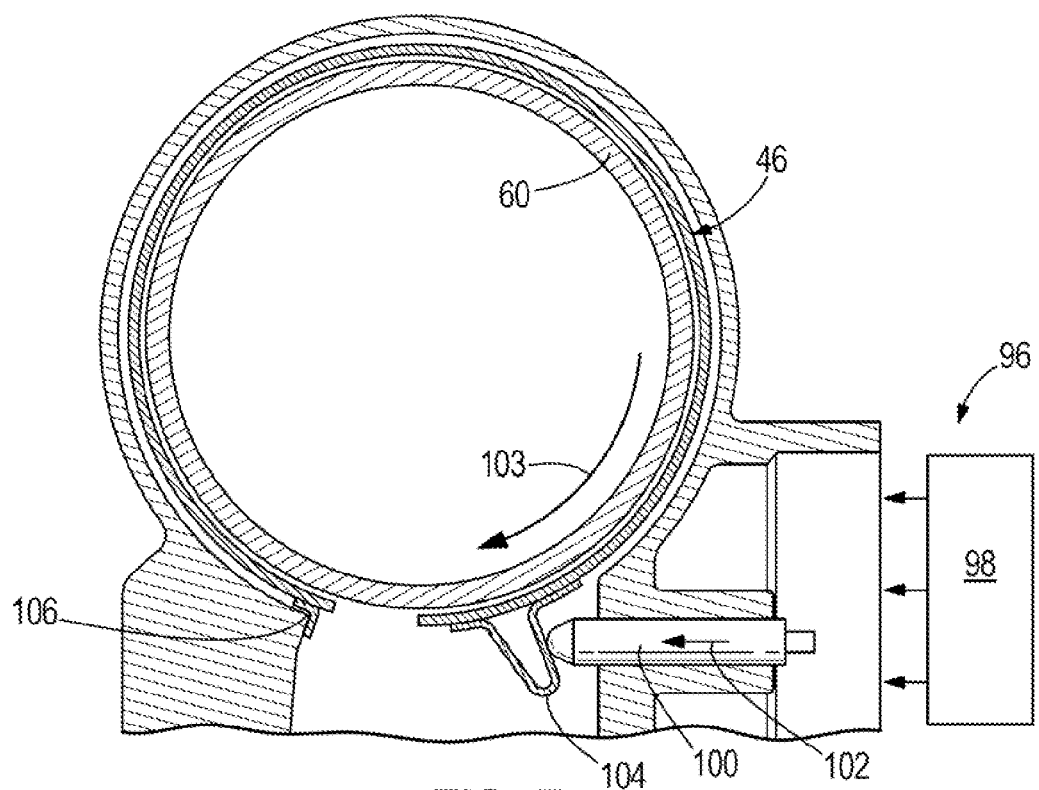
FIG. 7 is a top view of a brake for the transmission.
Figure 8:
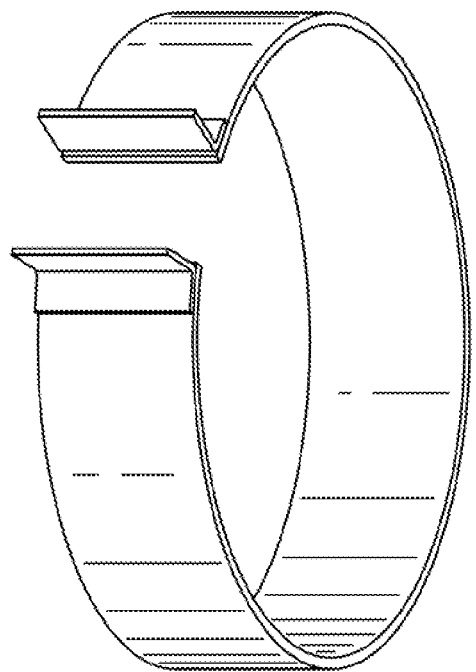
FIG. 8 is a perspective view of a band brake for the transmission.
Figure 9:
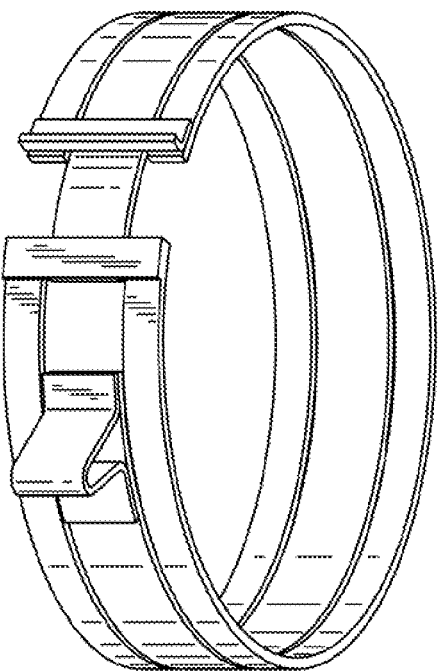
FIG. 9 is a perspective view of another type of band brake for the transmission.

Referring to FIGS. 7-9, the exact construction of the forward and reverse brakes 46, 48 can vary. In certain examples the forward and reverse brakes 46, 48 are conventional single-wrapped band brakes, as shown in FIG. 8. In certain examples the forward and reverse brakes 46, 48 are conventional double-wrapped band brakes, as shown in FIG. 9. The functionality of single-wrapped band brakes and double-wrapped band brakes generally is the same except the torque capability of the double-wrapped band brakes is higher than the single-wrapped band brakes for the same actuation force. In the example of FIGS. 2-6, the forward and reverse brakes 46, 48 are wrapped around and act on the forward and reverse brake drums 60, 94. Tightening the band brake prevents rotation of the brake drum. Loosening the band brake allows rotation of the brake drum. FIG. 7 depicts one example wherein the forward brake 46 is a double-wrapped band brake that is wrapped around the forward brake drum 60. The reverse brake 48 and reverse brake drum 94 can be configured in the same manner. An actuator 96 is configured to actuate the forward and reverse brakes 46, 48. The type of actuator can vary from that which is shown. In this example, the actuator 96 includes a servo-motor 98 that moves a pin 100 in the direction of arrow 102 against a bearing bracket 104 disposed at one end of the forward brake 46. The other end of the forward brake 46 is fixed to a gearcase housing 106. Movement of the pin 100 in the direction of arrow 102 tightens the forward brake 46 about the brake drum 60, thus preventing the brake drum 60 from rotating. In this example, the forward and reverse brakes 46, 48 are self-energized, which means that the direction of rotation of the forward and reverse brake drums 60, 94 (as shown at arrow 103) is the same as the direction of actuation shown at arrow 102. Thus, rotation of the brake drums 60, 94 assists actuation of the forward and reverse brakes 46, 48. Movement of the pin 100 opposite the direction of arrow 102 loosens the forward brake 46 with respect to the brake drum 60, thus allowing the brake drum 60 to rotate.

Figure 10:
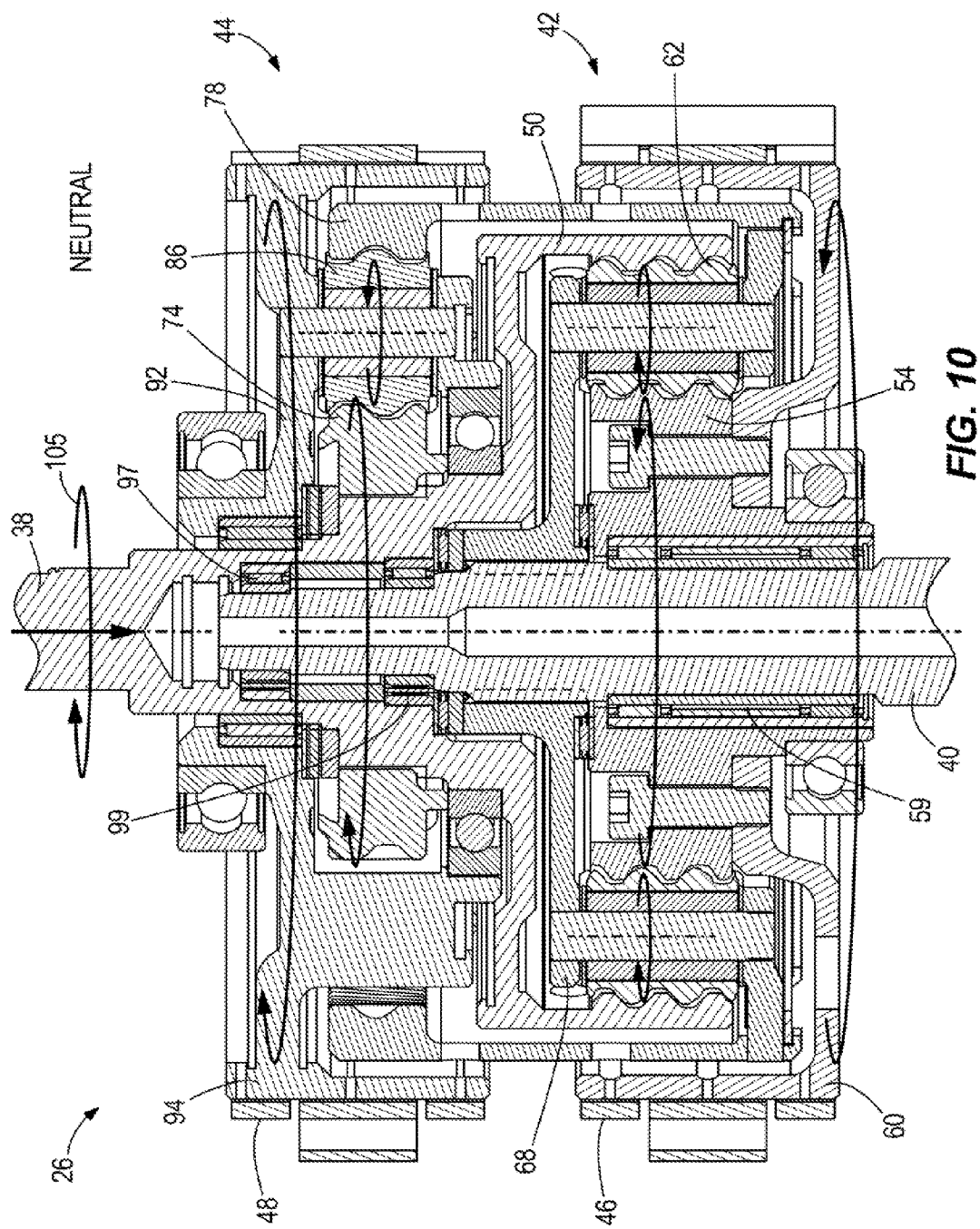
FIG. 10 is a view of section 10-10 taken in FIG. 2, showing the transmission in neutral gear.
Figure 11:
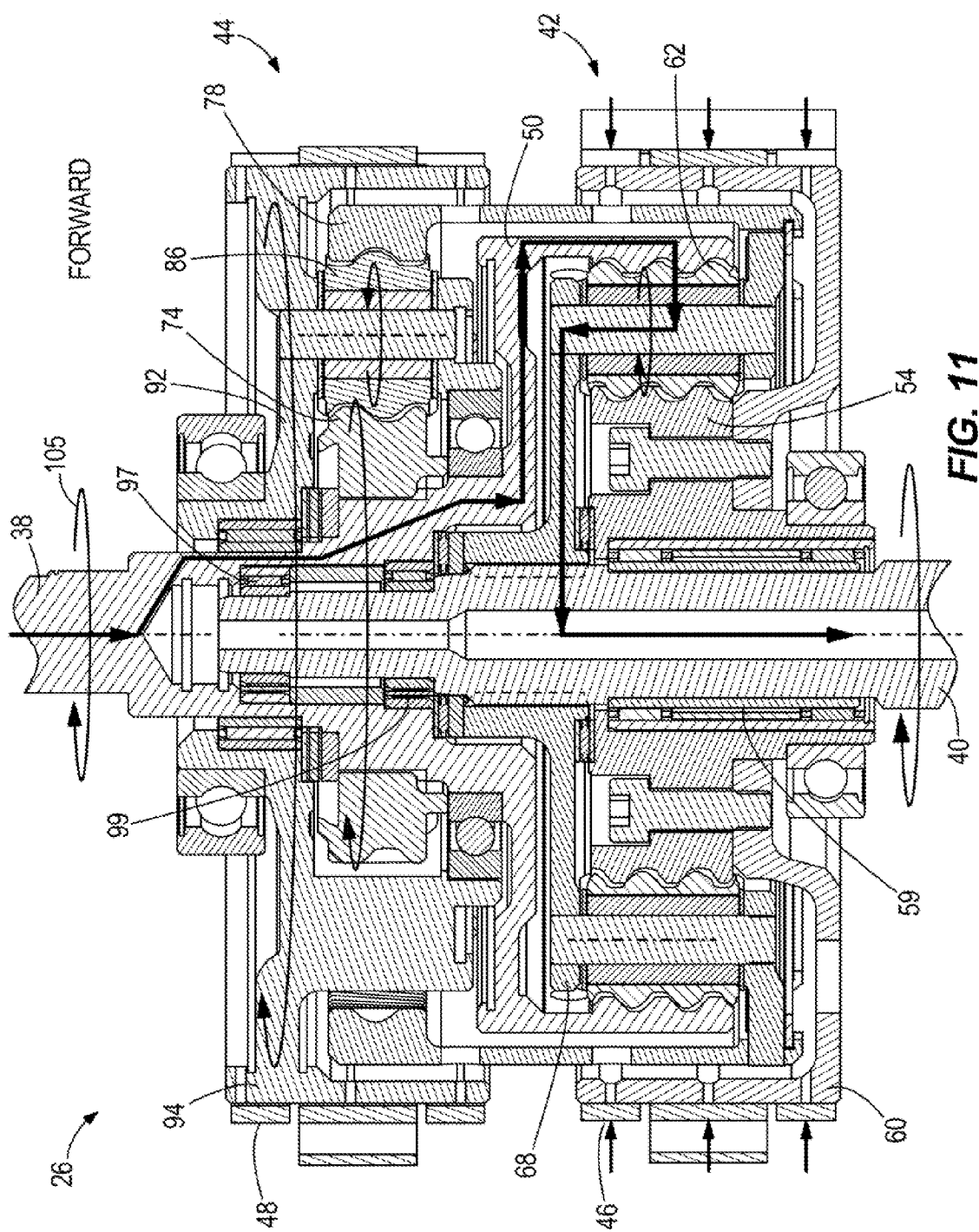
FIG. 11 is a view of section 10-10 taken in FIG. 2, showing the transmission in forward gear.
Figure 12:
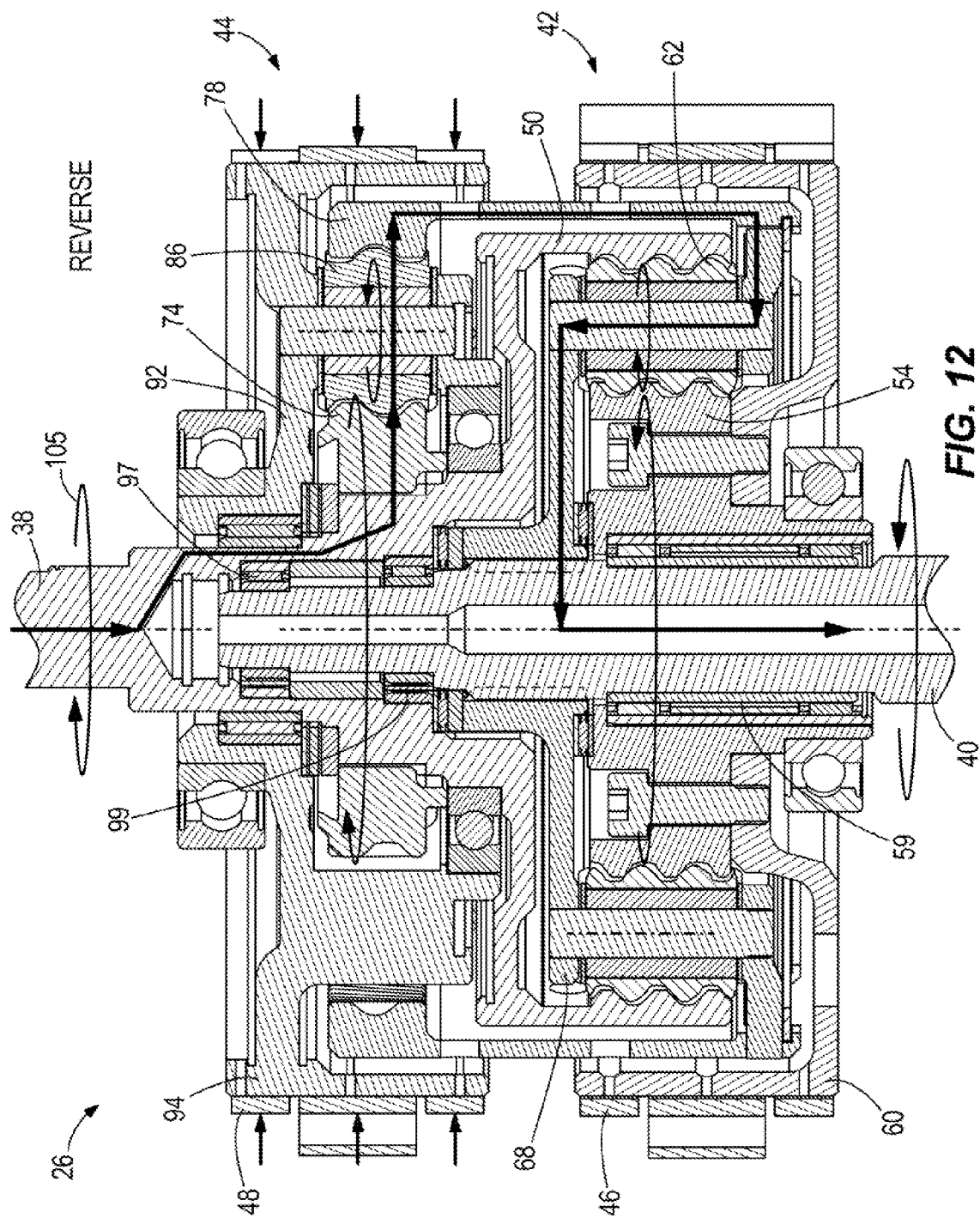
FIG. 12 is a view of section 10-10 taken in FIG. 2, showing the transmission in reverse gear.

Referring to FIGS. 10-12, the transmission 26 is able to engage the input shaft 38 with the output shaft 40 in neutral, forward and reverse gears. FIG. 10 shows the transmission 26 in neutral gear, wherein rotation of the input shaft 38 does not cause rotation of the output shaft 40. In the neutral gear, neither of the brakes 46, 48 are tightened about the brake drums 60, 94. That is, the actuator 96 has not moved the pin 100 in the direction of arrow 102. As such, both brake drums 60, 94 are free to rotate. Thus forward rotation of the input shaft 38 (shown at arrow 105) causes forward rotation of the reverse sun gear 74 and forward ring gear 50. The forward rotation of the reverse sun gear 74 causes reverse rotation of the reverse planet gears 86, which in turn causes forward rotation of the reverse carrier 92 and reverse brake drum 94. The forward rotation of the forward ring gear 50 causes reverse rotation of the forward planet gears 62, which causes reverse rotation of the forward brake drum 60. The forward carrier 68 and output shaft 40 remain stationary. The rotation of the input shaft 38 is not translated to the output shaft 40.

FIG. 11 depicts the transmission 26 in forward gear, wherein the forward brake 46 is actuated by the actuator 96 so as to move the pin 100 in the direction of arrow 102, which as described herein above, holds the forward brake drum 60 and forward sun gear 54 stationary. Forward rotation of the input shaft 38 (at 105) causes forward rotation of the forward ring gear 50, which in turn causes forward rotation of the plurality of forward planet gears 62 and forward rotation of the forward carrier 68 and output shaft 40. The forward rotation of the reverse sun gear 74 also results in reverse rotation of the plurality of reverse planet gears 86 and forward rotation of the reverse carrier 92 and reverse brake drum 94.

FIG. 12 shows the transmission 26 in reverse gear, wherein the actuator 96 moves the pin 100 in the direction of arrow 102, which as described herein above, holds the reverse brake drum 94 and reverse carrier 92 stationary. This prevents the plurality of reverse planet gears 86 from rotating about the reverse sun gear 74. Forward rotation of the input shaft 38 (at 105) causes forward rotation of the reverse sun gear 74, which causes reverse rotation of the plurality of reverse planet gears 86 about their own center axis 88, which causes reverse rotation of the reverse ring gear 78, which in turn causes reverse rotation of the forward carrier 68 and the output shaft 40.

In can thus be seen that rotation of the input shaft 38 simultaneously directly powers both of the forward and reverse planetary gearsets 42, 44. More specifically, rotation of the input shaft 38 simultaneously, directly powers the forward planetary gearset 42 via the forward ring gear 50 and the reverse planetary gearset 44 via the reverse sun gear 74.

Figure 2:
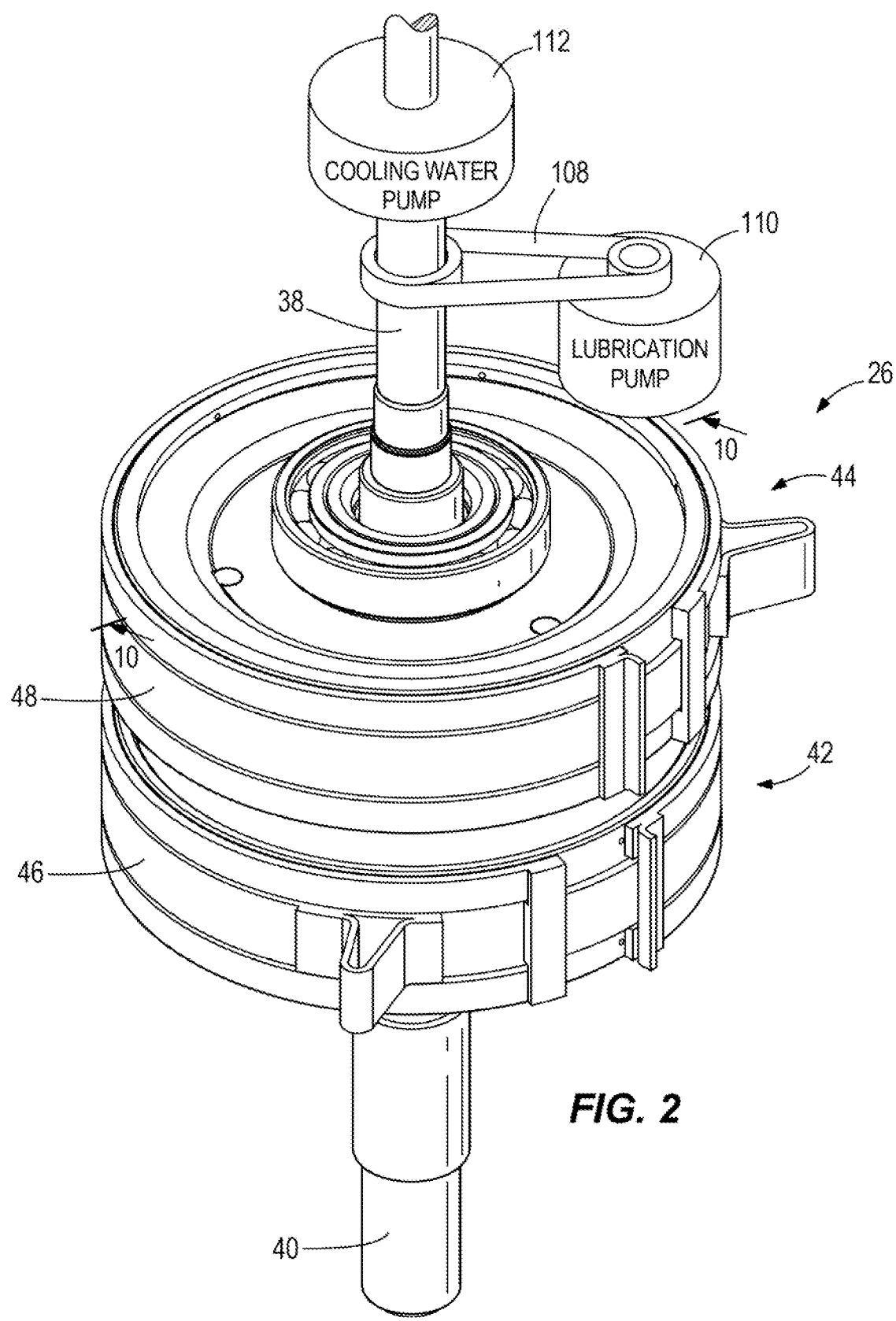
FIG. 2 is a perspective view of a transmission for the outboard marine propulsion device.
Figures 3, 4:
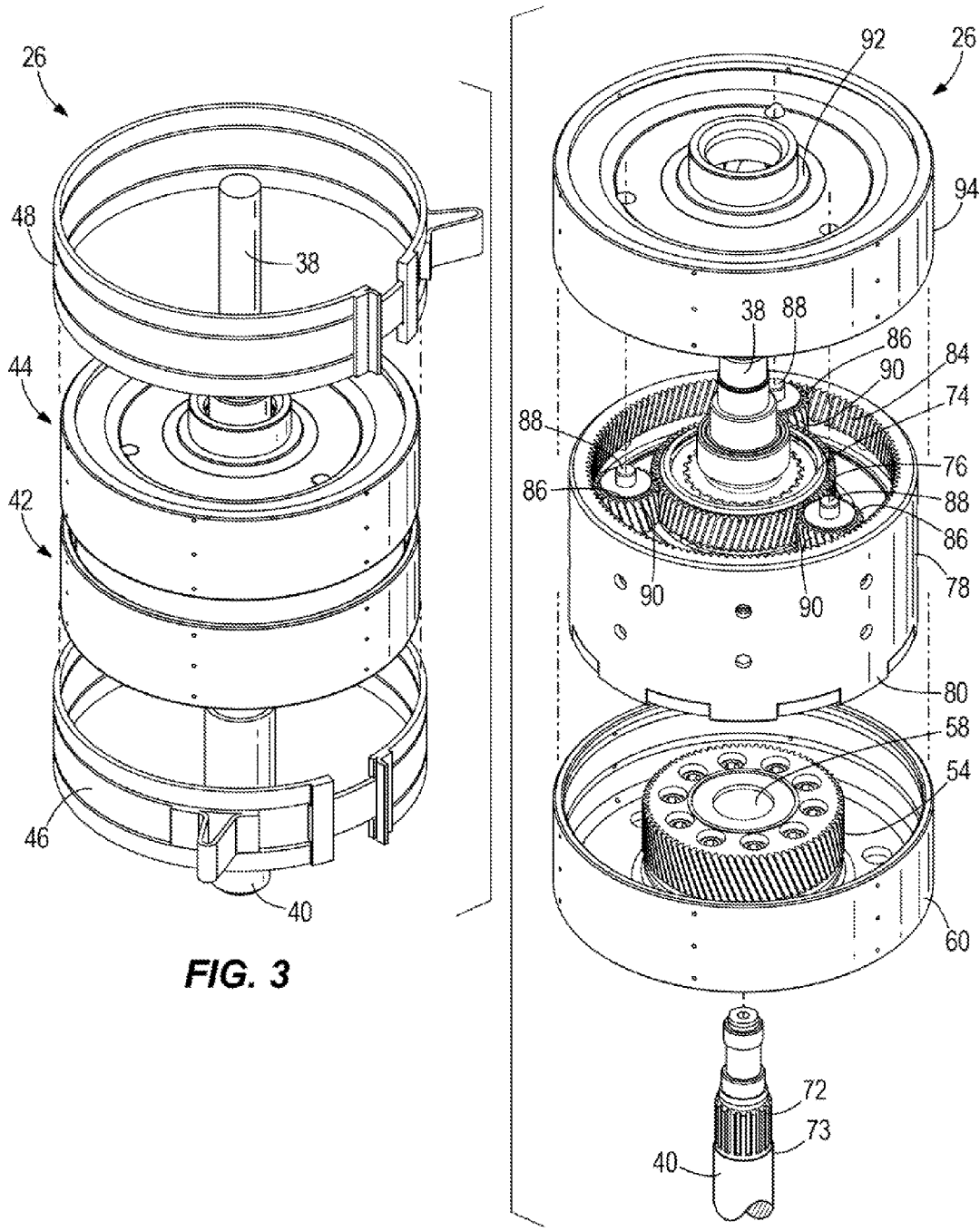
FIGS. 3-6 are exploded views of the transmission.
Figure 5:
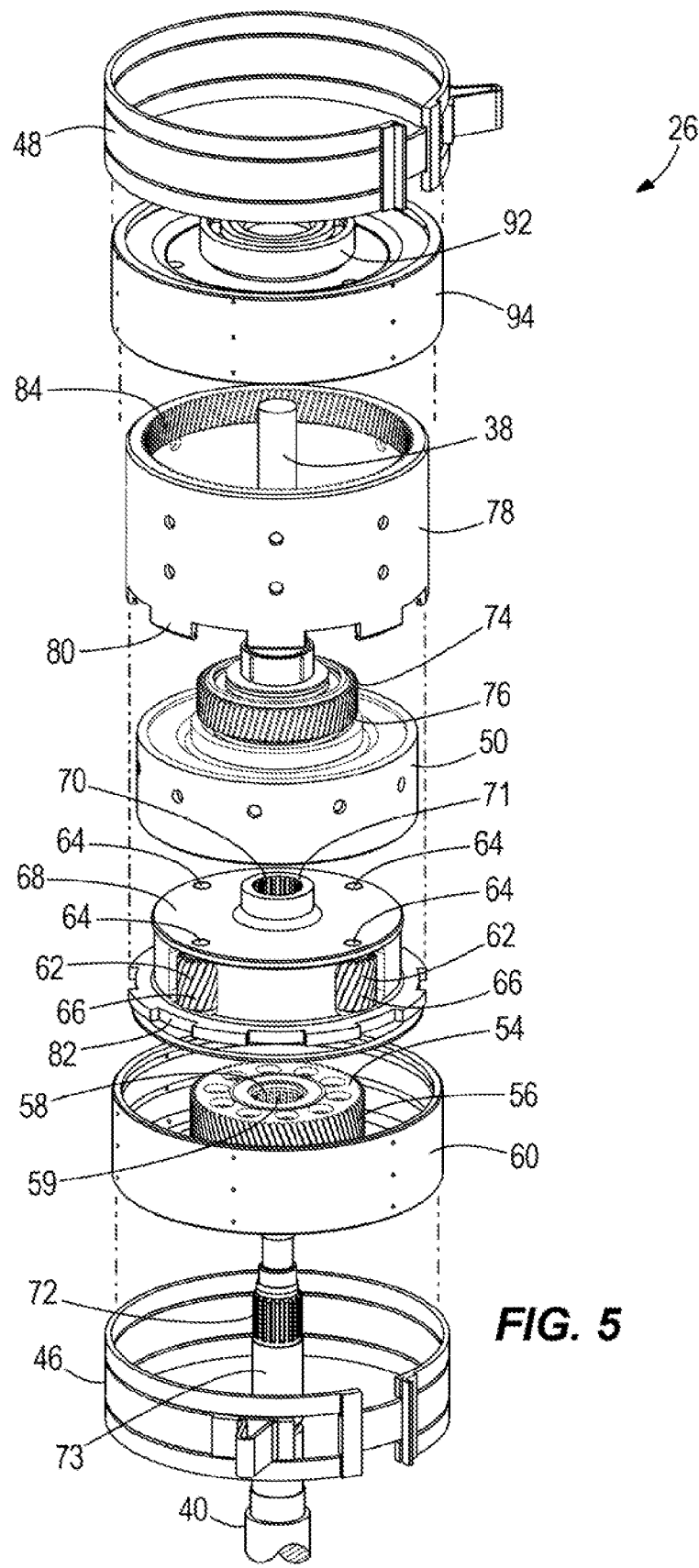
Figure 6:
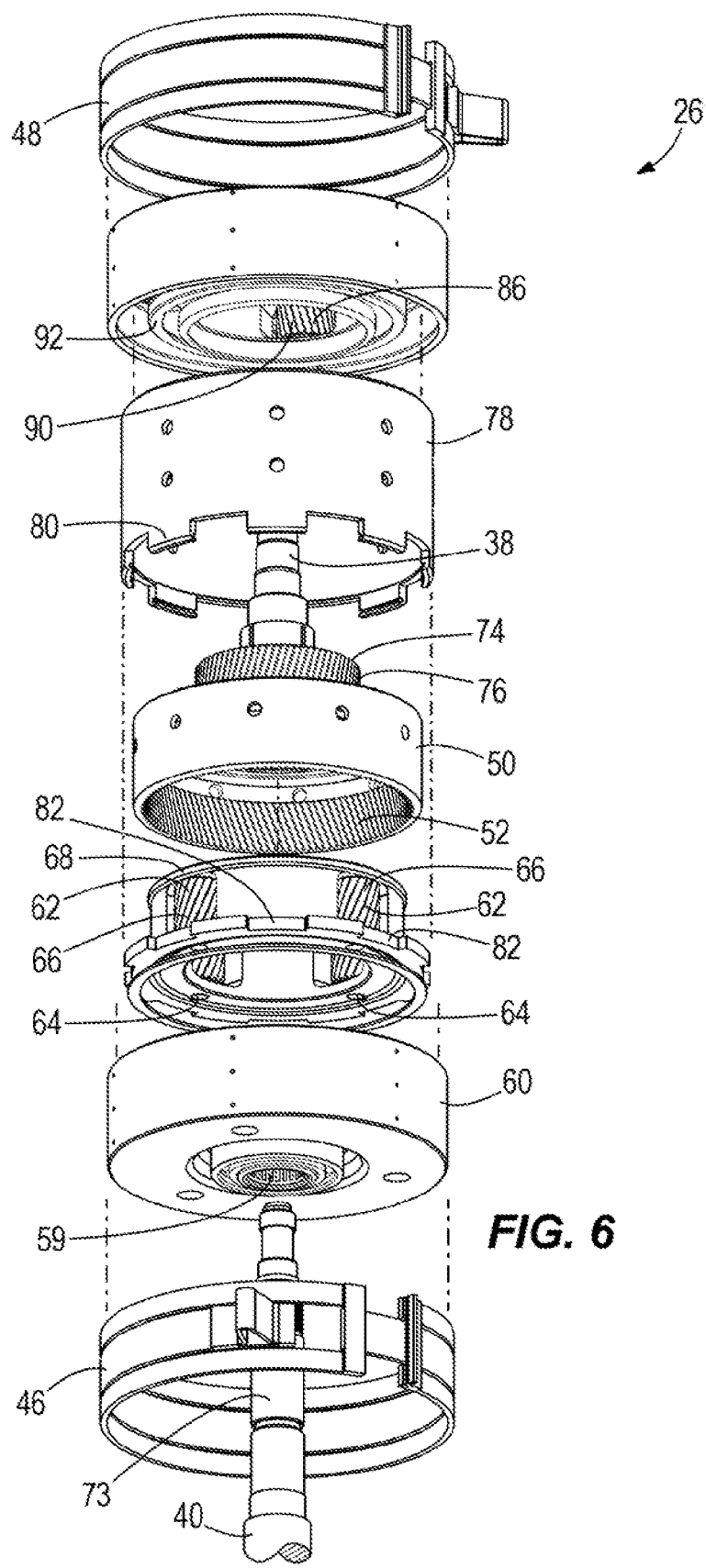

As shown in FIG. 2, a belt 108 connects the input shaft 38 to a lubrication pump 110 for providing lubrication, e.g. oil, to the transmission and lower gearbox unit 26. Thus the lubrication pump 110 will operate any time that the engine 18 is operating. A cooling water pump 112 is directly connected to the input shaft 38 such that rotation of the input shaft 38 causes the cooling water pump 112 to pump cooling water to the engine 18. Thus the cooling water pump 112 will operate any time that the engine 18 is operating. Neither the lubrication pump 110 nor the cooling water pump 112 will change their operation based upon a change in gear implemented by the transmission 26.

The components of the transmission 26 can be made of various materials, including metal, including steel and for example cast iron, which dissipates heat.

Advantageously the transmission 26 can be configured to provide the same speed reduction in both forward and reverse gears, have a high power density compared to prior art.

Advantageously the transmission 26 can sustain specified torque input, speed, shift cycles and transient conditions such as wave jump, throttle chop, and/or the like and still be located between the driveshaft housing 24 and the gearcase housing 32, for example within a minimum axial length, while still maintaining a hydrodynamic gearcase shape that minimizes drag.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A transmission for a marine propulsion device having an internal combustion engine that drives a propulsor for propelling a marine vessel in water, the transmission comprising:
    an input shaft that is driven into rotation by the engine;
    an output shaft that drives the propulsor into rotation,
    a forward planetary gearset that connects the input shaft to the output shaft so as to drive the output shaft into forward rotation;
    a reverse planetary gearset that connects the input shaft to the output shaft so as to drive the output shaft into reverse rotation,
    a forward brake that engages the forward planetary gearset in a forward gear in which the forward planetary gearset drives the output shaft into the forward rotation; and
    a reverse brake that engages the reverse planetary gearset in a reverse gear in which the reverse planetary gearset drives the output shaft into the reverse rotation;
    wherein actuation of neither of the forward brake and the reverse brake actuates a neutral gear in which the output shaft is disconnected from the input shaft;
    wherein the forward planetary gearset comprises a forward ring gear that is fixed to and rotates with the input shaft, the forward ring gear comprising a radially inwardly facing gear surface;
    wherein the forward planetary gearset further comprises a forward sun gear that is disposed on the output shaft, the forward sun gear comprising a radially outwardly facing gear surface;
    wherein the forward sun gear comprises a radially inwardly facing bearing surface that bears on the output shaft such that the forward sun gear is rotatable with respect to the output shaft; and
    wherein the forward planetary gearset further comprises a forward brake drum that rotates with the forward sun gear;
    wherein the forward planetary gearset further comprises a plurality of forward planet gears that are rotatable about their own center axis and that are radially disposed between the forward ring gear and the forward sun gear, wherein each forward planet gear in the plurality of forward planet gears comprises a radially outwardly facing gear surface that is engaged with the radially inwardly facing gear surface of the forward ring gear and the radially outwardly facing gear surface of the forward sun gear;
    wherein the forward planetary gearset further comprises a forward carrier that retains the plurality of forward planet gears, wherein the forward carrier is fixed to and rotates with the output shaft, and wherein the forward carrier is rotatable with respect to the forward ring gear and the forward sun gear;
    wherein the reverse planetary gearset comprises a reverse sun gear that is fixed to and rotates with the input shaft, the reverse sun gear comprising a radially outwardly facing gear surface;
    wherein the reverse planetary gearset further comprises a reverse ring gear that is fixed to and rotates with the forward carrier, the reverse ring gear comprising radially inwardly facing gear surface;
    wherein the reverse planetary gearset further comprises a plurality of reverse planet gears that are rotatable about their own center axis and that are radially disposed between the reverse ring gear and the reverse sun gear, wherein each reverse planet gear in the plurality of reverse planet gears comprises a radially outwardly facing gear surface that is engaged with the radially inwardly facing gear surface of the reverse ring gear and the radially outwardly facing gear surface of the reverse sun gear;
    wherein the reverse planetary gearset further comprises a reverse carrier that retains the plurality of reverse planet gears, wherein the reverse carrier is rotatable with respect to the reverse ring gear and the reverse sun gear;
    wherein in neutral gear, rotation of the input shaft does not cause rotation of the output shaft;
    wherein in neutral gear, forward rotation of the input shaft causes forward rotation of the reverse sun gear, which causes reverse rotation of the plurality of reverse planet gears, which causes forward rotation of the reverse carrier and reverse drum; and wherein forward rotation of the input shaft further causes forward rotation of the forward ring gear, which causes forward rotation of the plurality of forward planet gears and thus reverse rotation of the forward sun gear.

2. The transmission according to claim 1, further comprising a reverse drum that rotates with the reverse carrier.

3. The transmission according to claim 2, wherein the forward brake and the reverse brake are band brakes that act on the forward drum and reverse drum, respectively.

4. The transmission according to claim 3, wherein at least one of the forward and reverse brakes comprises a double-wrapped band brake.

5. The transmission according to claim 2, further comprising an actuator that actuates at least one of the forward and reverse brakes.

6. The transmission according to claim 1, wherein in forward gear:

the forward drum and the forward sun gear are held stationary by the forward brake; and forward rotation of the input shaft causes forward rotation of the forward ring gear, which causes forward rotation of the plurality of forward planet gears and forward rotation of the forward carrier and the output shaft.

7. The transmission according to claim 6, wherein in reverse gear;
the reverse carrier is held stationary by the reverse brake, which prevents the plurality of reverse planet gears from rotating about the reverse sun gear; and
forward rotation of the input shaft causes forward rotation of the reverse sun gear, which causes reverse rotation of the plurality of reverse planet gears about their own axis, which causes reverse rotation of the reverse ring gear, which causes reverse rotation of the forward carrier and the output shaft.

8. The transmission according to claim 7, wherein rotation of the input shaft simultaneously directly powers the forward planetary gearset via the forward ring gear and the reverse planetary gearset via the reverse sun gear.

9. The transmission according to claim 1, wherein rotation of the input shaft simultaneously directly powers both of the forward and reverse planetary gearsets.

10. The transmission according to claim 1, wherein the output shaft and input shaft are coaxially aligned.

11. The transmission according to claim 10, comprising a first plurality of bearings that supports the forward planetary gearset and a second plurality of bearings that supports the reverse planetary gearset, wherein the first and second pluralities of bearings are coaxially aligned.

12. The transmission according to claim 1, comprising a belt that connects the input shaft to a lubrication pump such that rotation of the input shaft powers the lubrication pump.

13. The transmission according to claim 1, comprising a water pump connected to the input shaft, wherein rotation of the input shaft powers the water pump.

14. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a forward planetary gearset that connects the input shaft to the output shaft so as to drive the output shaft into forward rotation;
a reverse planetary gearset that connects the input shaft to the output shaft so as to drive the output shaft into reverse rotation;
a forward brake that engages the forward planetary gearset in a forward gear wherein the forward planetary gearset drives the output shaft into the forward rotation; and
a reverse brake that engages the reverse planetary gearset in a reverse gear wherein the reverse planetary gearset drives the output shaft into the reverse rotation;
wherein the forward and reverse planetary gearsets both provide the same speed reduction from the input shaft to the output shaft.

15. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a forward planetary gearset that connects the input shaft to the output shaft so as to drive the output shaft into forward rotation;
a reverse planetary gearset that connects the input shaft to the output shaft so as to drive the output shaft into reverse rotation;
a forward brake that engages the forward planetary gearset in a forward gear wherein the forward planetary gearset drives the output shaft into the forward rotation; and
a reverse brake that engages the reverse planetary gearset in a reverse gear wherein the reverse planetary gearset drives the output shaft into the reverse rotation;
wherein the forward planetary gearset comprises
a forward ring gear that is fixed to and rotates with the input shaft, the forward ring gear comprising a radially inwardly facing gear surface,
a forward sun gear that is disposed on the output shaft, the forward sun gear comprising a radially outwardly facing gear surface,
a radially inwardly facing bearing surface that bears on the output shaft such that the forward sun gear is rotatable with respect to the output shaft,
a forward brake drum that rotates with the forward sun gear,
a plurality of forward planet gears that are rotatable about their own center axis and that are radially disposed between the forward ring gear and the forward sun gear, wherein each forward planet gear in the plurality of forward planet gears comprises a radially outwardly facing gear surface that is engaged with the radially inwardly facing gear surface of the forward ring gear and the radially outwardly facing gear surface of the forward sun gear, and
a forward carrier that retains the plurality of forward planet gears, wherein the forward carrier is fixed to and rotates with the output shaft, and wherein the forward carrier is rotatable with respect to the forward ring gear and the forward sun gear, and
wherein in forward gear the forward drum and the forward sun gear are held stationary by the forward brake, and forward rotation of the input shaft causes forward rotation of the forward ring gear, which causes forward rotation of the plurality of forward planet gears and forward rotation of the forward carrier and the output shaft.

16. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a forward planetary gearset that connects the input shaft to the output shaft so as to drive the output shaft into forward rotation, the forward planetary gearset comprising a forward carrier;
a reverse planetary gearset that connects the input shaft to the output shaft so as to drive the output shaft into reverse rotation;
a forward brake that engages the forward planetary gearset in a forward gear wherein the forward planetary gearset drives the output shaft into the forward rotation; and
a reverse brake that engages the reverse planetary gearset in a reverse gear wherein the reverse planetary gearset drives the output shaft into the reverse rotation;

wherein the reverse planetary gearset comprises
- a reverse sun gear that is fixed to and rotates with the input shaft, the reverse sun gear comprising a radially outwardly facing gear surface,
- a reverse ring gear that is fixed to and rotates with the forward carrier, the reverse ring gear comprising radially inwardly facing gear surface,
- a plurality of reverse planet gears that are rotatable about their own center axis and that are radially disposed between the reverse ring gear and the reverse sun gear, wherein each reverse planet gear in the plurality of reverse planet gears comprises a radially outwardly facing gear surface that is engaged with the radially inwardly facing gear surface of the reverse ring gear and the radially outwardly facing gear surface of the reverse sun gear,
- a reverse carrier that retains the plurality of reverse planet gears, wherein the reverse carrier is rotatable with respect to the reverse ring gear and the reverse sun gear, and
- a reverse drum that rotates with the reverse carrier, wherein in the reverse gear the reverse carrier is held stationary by the reverse brake, which prevents the plurality of reverse planet gears from rotating about the reverse sun gear, and forward rotation of the input shaft causes forward rotation of the reverse sun gear, which causes reverse rotation of the plurality of reverse planet gears about their own axis, which causes reverse rotation of the reverse ring gear, which causes reverse rotation of the forward carrier and the output shaft.

\* \* \* \* \*